United States Patent [19]

Hunag

[11] Patent Number: 5,439,761
[45] Date of Patent: Aug. 8, 1995

[54] BATTERY BOX FOR A SEARCH LIGHT

[76] Inventor: Ming-Chou Hunag, No. 16, Lane 43, Hua Cheng Rd., Hsin Chuang, Taipei, Hsien, Taiwan

[21] Appl. No.: 230,835

[22] Filed: Apr. 21, 1994

[51] Int. Cl.⁶ ............................................. H01M 2/10
[52] U.S. Cl. .................................... 429/100; 429/123
[58] Field of Search ........................... 429/48, 96-100, 429/121-123, 176, 163; 206/333, 811; 439/522, 500

[56] References Cited

U.S. PATENT DOCUMENTS

| | | | |
|---|---|---|---|
| 3,963,972 | 6/1976 | Todd | 429/97 X |
| 4,983,473 | 1/1991 | Smith | 429/121 X |
| 5,004,129 | 4/1991 | Loch et al. | 429/97 X |
| 5,202,200 | 4/1993 | McMillan, Jr. et al. | 429/100 X |
| 5,244,411 | 9/1993 | Schinke et al. | 429/97 X |

*Primary Examiner*—Anthony Skapars
*Attorney, Agent, or Firm*—Jacobson, Price, Holman & Stern

[57] ABSTRACT

A battery box includes a rectangular box body to hold a battery, and a rectangular top cover fastened to the box body by fasteners, the box body having curved horizontal flanges vertically spaced at one side and provided with rubber pads for supporting on an oxygen cylinder being carried on the shoulder; the top cover having two long side bottom edges curved outwards and attached to two opposite long sides of the box body at the top, and two short side bottom edges curved inwards and attached to two opposite short sides of the body body at the top, and two opposite contact metal springs on the inside respectively connected to the two electrical input terminals of an external search light by a cord, the contact metal springs being respectively connected to the two opposite terminals of the battery when the top cover is closed, causing the search light to be electrically connected to the battery.

4 Claims, 4 Drawing Sheets

BATTERY BOX FOR A SEARCH LIGHT

BACKGROUND OF THE INVENTION

The present invention relates to battery boxes, and more particularly to a battery box for use with a search light.

Various search lights have been disclosed for use under water. For use with this type of search light, the battery box must be made water-tight or sealed water-tightly. When a battery box and a search light are used together, it is inconvenient to carry them with both hands. Furthermore, because the two opposite electrical terminals of the search light are commonly directly connected to the two opposite terminals of the battery in the battery box, power loss cannot be completely eliminated even when the search light does no work, and therefore the service life of the battery will be shortened.

SUMMARY OF THE INVENTION

According to one aspect of the present invention, the battery box comprises a box body to carry a battery, and a top cover fastened to the box body by two fasteners to seal it against water. The top cover has two long side bottom edges curved outwards, with ends elevated from the box body when they are respectively attached to two opposite long sides on the box body, and two short side bottom edges curved inwards, with a middle part elevated from the body when they are respectively attached to two opposite short sides on the body box, When the fasteners are fastened, the short and long side bottom edges of the top cover are strained, causing gaps between the top cover and the box body to be sealed water-tightly.

According to another aspect of the present invention, the top cover further comprises two contact metal springs on the inside respectively connected to the two opposite electrical input terminals of an external search light by a cord, wherein the contact metal springs are respectively maintained in contact with the terminals of battery received in the box body, when the top cover is closed on the box body, causing the search light to be electrically connected to the battery; the contact metal springs are disconnected from the terminals of the battery, when the top cover is opened or closed on the box body in the reversed direction, causing the search light to be electrically disconnected.

According to still another aspect of the present invention, the box body further comprises a plurality of curved outside flanges horizontally raised from one long side wall thereof at different elevations and provided with a plurality of rubber pads, so that battery box can be carried on the shoulder and fitted over an oxygen cylinder being carried on the back.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
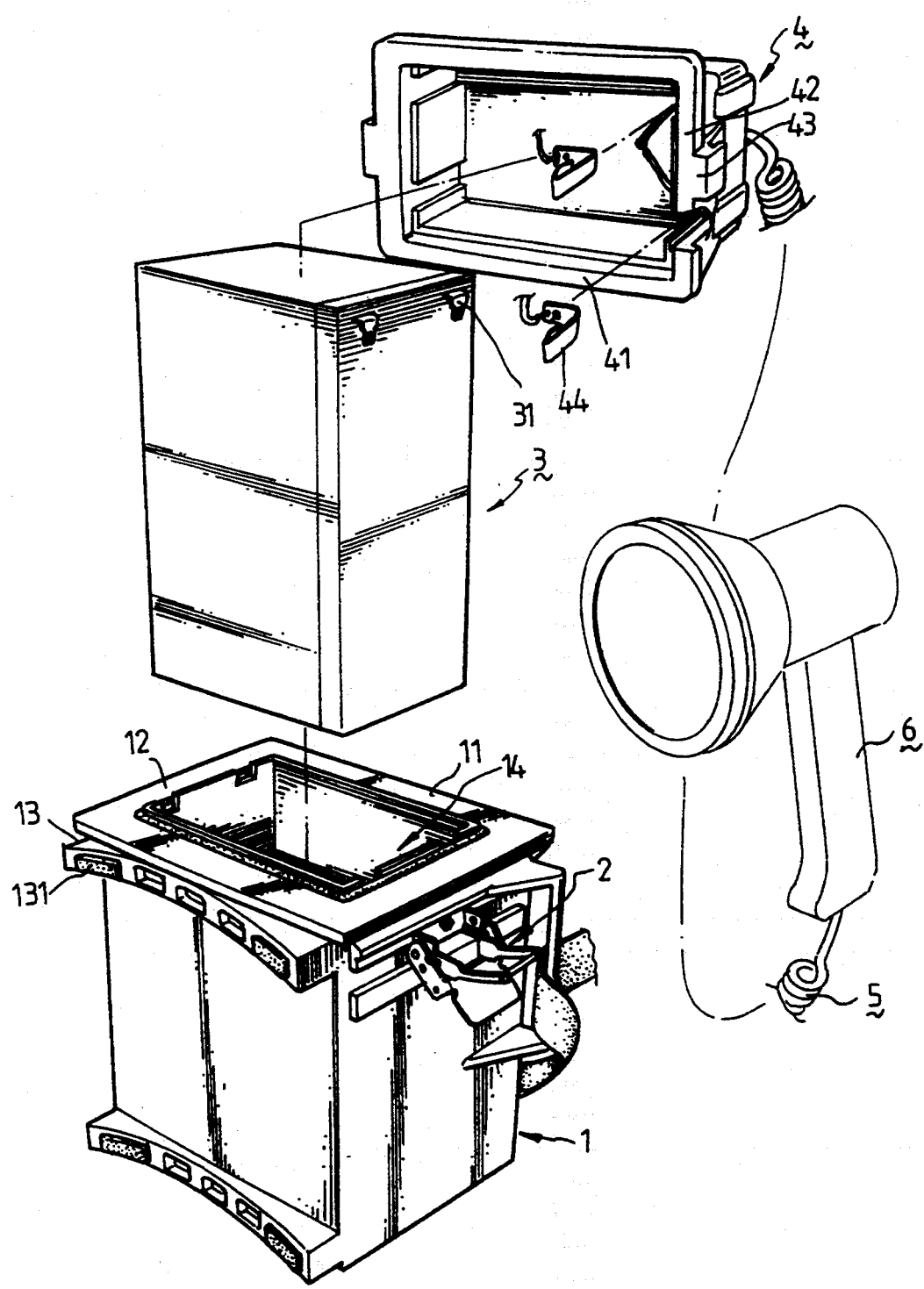
FIG. 1 is an exploded view of a battery box according to the preferred embodiment of the present invention.
Figure 2:
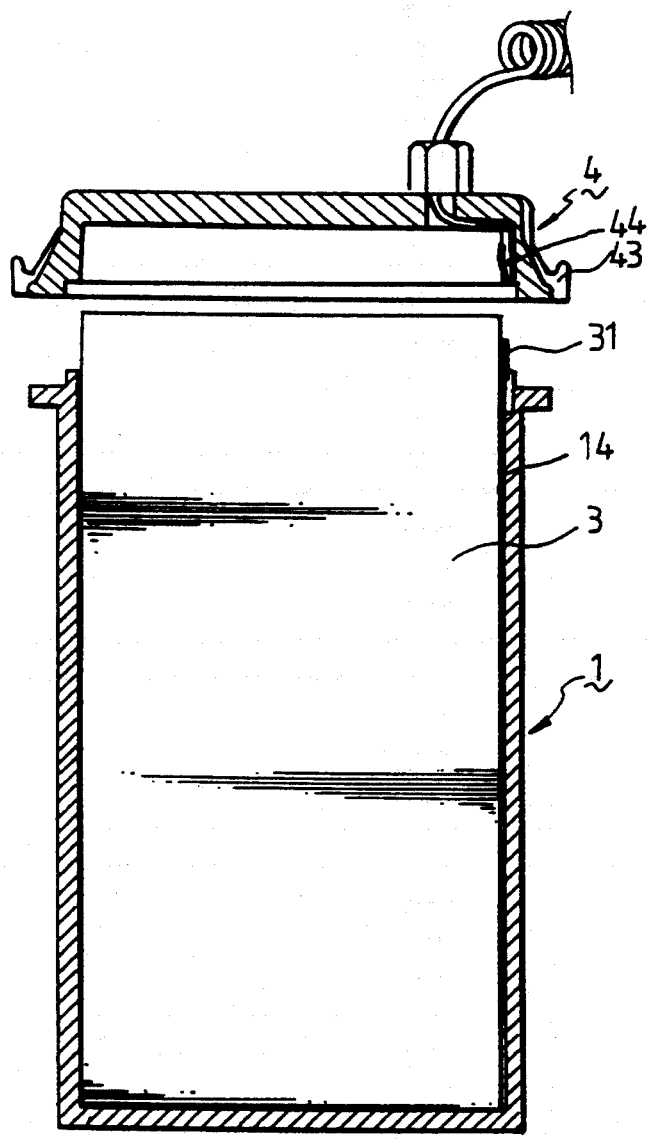
FIG. 2 is a longitudinal view in section of the battery box shown in FIG. 1.
Figure 3:
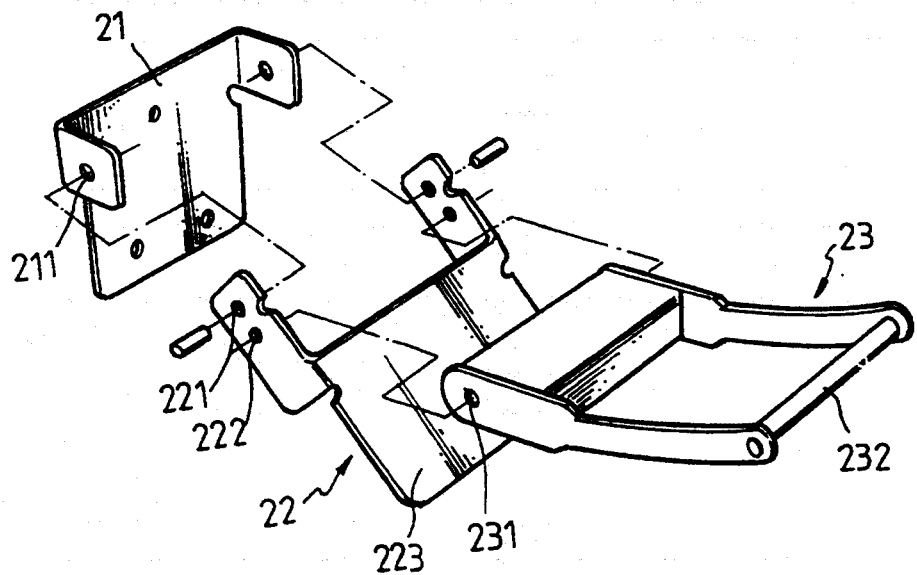
FIG. 3 is an exploded view of a fastener for fastening the battery box shown in FIG. 1.

Referring to FIGS. 1 and 3, the battery box is generally comprised of a box body 1, and a top cover 4, The box body 1 is a rectangular container defining a storage space 14 on the inside, which receives a battery 3. There are two curved outside flanges 13 raised from the front side of the box body 1 at different elevations, each curved outside flange 13 being respectively provided mounted with a plurality of rubber pads 131. A fastener 2 is respectively mounted on each lateral side of the box body 1, comprised of a mounting frame 21, a press plate 22, and a strap 23. The press plate 22 comprises a first pair of opposite pivot holes 221 respectively pivotally connected to a respective pair of opposite pivot holes 211 on the mounting frame 21, a press portion 223 for pressing by hand, and a second pair of opposite pivot holes 222 spaced between the first pair of opposite pivot holes 221 and the press portion 223. The strap 23 comprises a pair of-opposite pivot holes 231 at one end pivotally connected between the second pair of opposite pivot holes 222 on the press plate 22, and a cross rod 232 at an opposite end. The top cover 4 is made of rectangular shape, having, two long side bottom edges 41 curved outwards, and which each have two opposite ends elevated from the box body 1 when they are respectively attached to two opposite long sides 11 of the box body 1 at the top, and two short side bottom edges 42 curved inwards, which each have a middle part elevated from the body body 1 when they are respectively attached to two opposite short sides 12 of the body body 1 at the top, and two hooks 43 respectively upwardly extended from the middle of either short side bottom edge 42 for fastening the cross rod 232 of the respective fastener 2, and two contact metal springs 44 on the inside near one short side thereof respectively connected to two opposite electrical input terminals of a search light 6 by a cord 5.

Figure 4:
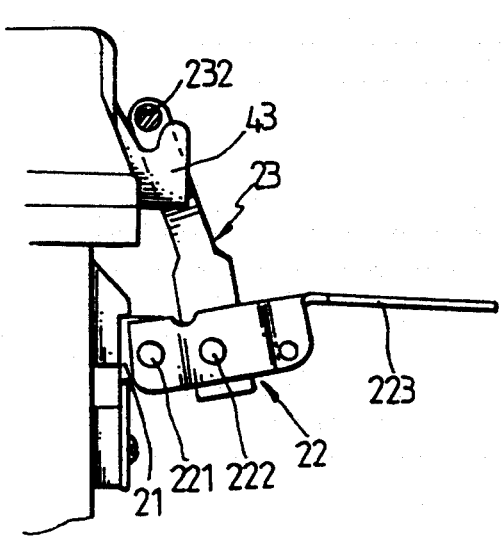
FIG. 4 shows the fastener of FIG. 3 installed.
Figure 5:
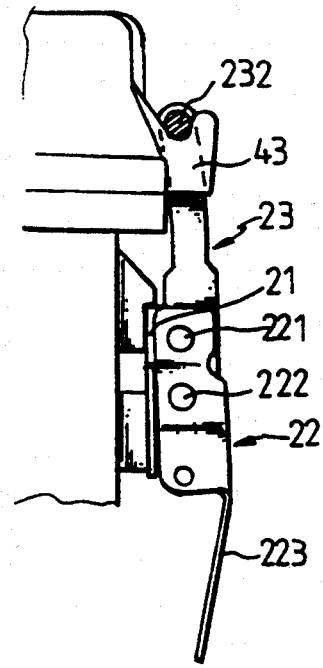
FIG. 5 is similar to FIG. 4 but showing the fastener when fastened.

Referring to FIGS. 3, 4, and 5, when the battery 3 is inserted into the storage space 14, the two terminals 31 are exposed to the outside; when the top cover 4 is placed on the box body 1 with the long and short side flanges 41;42 thereof respectively fitted over the long and short side flanges 11;12 of the box body 1, the cross bar 232 of the strap 23 of the fastener 2 at either side is hung on either hook 43, then the press portion 223 of the press plate 22 of each fastener 2 is respectively pressed down causing the the respective fastener 2 to be fastened.

Figure 6:
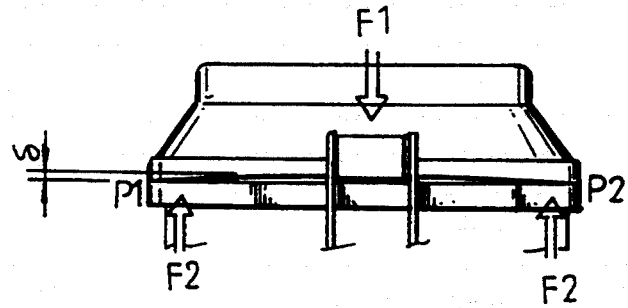
FIG. 6 shows the short side flanges of the top cover strained and closely fitted over the short side flanges on the box body.

Referring to FIG. 6, when the press portion 223 of the press plate 22 is pressed down causing the cross rod 232 of the strap 23 to be tightly fastened to the respective hook 43, a downward pressure F1 is given to the respective short side flange 42. Because the short side bottom edge 42 at either short side of the top cover 4 curves inwards, it is supported on the respective short side 12 of the box body 1 at two opposite bearing points P1; P2. Therefore, when the respective fastener 2 is fastened, the bearing points P1;P2 are forced to produce a respective reactive force F2 and a to be strained and δ is produced causing the respective short side bottom edge 42 to be strained and deform to closely fit over the respective short side 12 of the box body 1 at the top.

Figure 7:
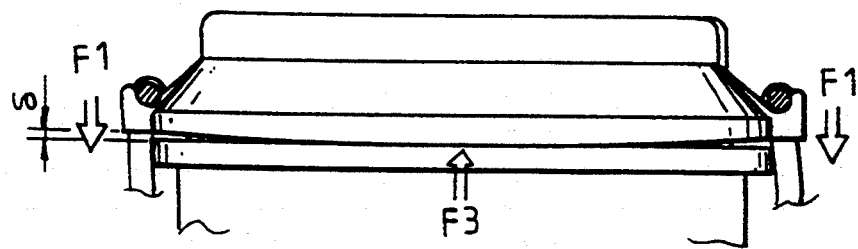
FIG. 7 shows the long side flanges of the top cover strained and closely fitted over the long side flanges on the box body.

Referring to FIG. 7, when the press portion 223 of the press plate 22 is pressed down causing the cross rod 232 of the strap 23 to be tightly fastened to the respective hook 43, a downward pressure F1 is given to the respective long side bottom edge 41. Because the long side bottom edge 41 at either long side of the top cover 4 curves outwards, the projecting point of the long side bottom edge 41 is forced to produce a reactive force F3 when the two fasteners 2 are fastened, and a strain of δ' is produced causing the two long side bottom edges 41 of the top cover to be stretched and deform and to closely fit over the two long sides 11 of the box body 1 at the top.

Referring to FIGS. 1 through 5 again, when the fasteners 2 are fastened to close the top cover 4 on the box body 1, the contact metal springs 44 are respectively maintained in contact with the terminals 31 of the battery 3, and therefore a DC power supply is connected to the search light 6. When the top cover 4 is opened from the box body 1, the metal contact springs 44 are disconnected from the terminals 31 of the battery 3, and therefore the DC power supply is cut off from the search light 6. Because the metal contact springs 44 are disposed adjacent one short side of the top cover 4 for connection to the terminals 31 at one side of the battery 3, the metal contact springs 44 do not contact the terminals 31 of the battery 3 when the top cover 4 is turned horizontally through a 180 degree angle and then placed on the box body 1. Furthermore, the design of the curved outside flanges 13 allows the battery box to be fitted over a oxygen cylinder when it is carried on the shoulder.

While only one embodiment of the present invention has been shown and described, it will be understood that various modifications and changes can be made without departing from the spirit, and scope of the invention.

What is claimed is:

1. A battery box comprising:
   a box body in the shape of a rectangular container with an open top defining a storage space to hold a battery and having two opposite short sides and two opposite long sides;
   a top cover of rectangular shape to fit on said box body at the top, said top cover comprising two long side bottom edges each curved outwards to provide two ends elevated from the opposite long sides of the box body when the cover is attached to the box body at the top, two short side bottom edges each curved inwards to provide a middle part elevated from the opposite short sides of the box body when the cover is attached to the box body at the top, and two hooks respectively outwardly extended from said two opposite short side bottom edges; and
   two fasteners respectively mounted on the two opposite short sides of said box body to be releasably fastened to said two hooks to hold down said top cover causing said short and long side bottom edges of said top cover to be stressed and closely fitted over the short and long sides of said box body at the top.

2. The battery box of claim 1 wherein each fastener is comprised of a mounting frame, a press plate pivoted to said mounting frame, and a strap pivoted to said press plate, said press plate comprising a first pair of opposite pivot holes respectively pivotally connected to a respective pair of opposite pivot holes on said mounting frame by a respective pivot pin, a press portion for pressing by hand, and a second pair of opposite pivot holes spaced between said first pair of opposite pivot holes and said press portion, said strap comprising a pair of opposite pivot holes at one end pivotally connected between said second pair of opposite pivot holes on said press plate by a respective pivot pin, and a cross rod at an opposite end to be releasably engage on either hook on said top cover, said cross rod being tightly fastened to the respective hook when said press portion is pressed down after said cross rod has been engaged on the respective hook.

3. The battery box of claim 1 wherein said top cover further comprises two internal contact metal springs respectively connected to two opposite electrical input terminals of an external search light cord, said contact metal springs being respectively maintained in contact with terminals of a battery received in said storage space of said box body, when said top cover is closed on said box body, causing said search light to be electrically connected to the battery.

4. The battery box of claim 1 wherein said box body further comprises a plurality of curved outside flanges raised from one long side wall thereof at different elevations for fitting over a cylindrical object, each curved outside flange being provided with a plurality of rubber pads.

* * * * *